United States Patent [19]
Jacobi

[11] Patent Number: 5,158,370
[45] Date of Patent: Oct. 27, 1992

[54] BAG VALVES

[75] Inventor: Stephen V. Jacobi, Ballwin, Mo.

[73] Assignee: Monsanto Company, St. Louis, Mo.

[21] Appl. No.: 910,695

[22] Filed: Sep. 22, 1986

Related U.S. Application Data

[63] Continuation-in-part of Ser. No. 828,931, Feb. 12, 1986.

[51] Int. Cl.$^5$ ............................................. B65D 33/16
[52] U.S. Cl. ........................................ 383/48; 383/54
[58] Field of Search ................................. 229/48, 54

[56] References Cited

U.S. PATENT DOCUMENTS

| | | | |
|---|---|---|---|
| 3,203,623 | 7/1967 | Hartig | 383/48 |
| 3,973,719 | 8/1976 | Johnson et al. | 220/359 |

Primary Examiner—Stephen P. Garbe
Attorney, Agent, or Firm—R. C. Loyer

[57] ABSTRACT

A bag having a filling valve integral with and extending though an end closure section of the bag adapted to be sealed by electromagnetic field induction heating. Valves having a thermoplastic polymeric inner layer are provided with metal foil adjacent to at least a part of the layer as means for inductively heating the polymeric inner layer. Methods and apparatus of sealing a bag having such a filling valve are provided.

1 Claim, 3 Drawing Sheets

BAG VALVES

This application is a continuation-in-part of Ser. No. 828,931, filed Feb. 12, 1986.

BACKGROUND OF THE INVENTION

The invention of this application relates to bag valves, such as are used for filling bags with bulk particulate material. Such bags have a valve in a collapsible tubular form generally located in an end closure of the bag. More particularly, this invention relates to an induction heat sealable valve and to methods and apparatus for sealing of such valves.

Many particulate materials, such as powders or granules of cement, flour, seeds, grains, chemicals and the like are packaged and transported in sealed bags, for instance multi-walled paper bags. To facilitate filling, such bags have long been provided with valves, for instance in a collapsible tubular form in an end closure. In a convenient method for filling such bags with bulk particulate material, a nozzle is inserted through the valve to allow the particulate material to flow into the bag.

Although the valve may tend to collapse to some degree upon withdrawal of the nozzle, many efforts have been made to provide a more secure closure of the valve to preclude subsequent communication through the bag valve which may result, for instance, in the loss of material from the bag or the introduction of foreign material such as insects or other contaminants into the bag. Secure closures have been obtained, for instance, by providing extending sleeves on the valve which can be folded to seal the valve. Such folded sleeves often exhibit the undesirable characteristic of becoming unfolded, e.g. accidentally or otherwise, resulting in possible transfer of material through the valve.

Alternatively, such externally extending sleeves have been taped or glued generally at considerable expense of time and labor. In still other cases valves have been provided with wire springs to securely fold an internally extending sleeve as disclosed for instance in U.S. Pat. No. 4,111,354. Such wire spring seals do not assure that material cannot be transferred through the valve.

In still other cases, valves have been sealed by applying an adhesive to the interior peripheral surfaces of the valve, for instance after filling of the bag as disclosed in U.S. Pat. No. 4,394,207. Such adhesive application is not carried out without some risk of product contamination with the applied adhesive. Contamination is reduced by the use of releasable glue spots within a valve, for instance comprising a polyethylene line, as is disclosed in U.S. Pat. No. 4,049,191. Such releasable sealing, however, allows a sealed valve to be repeatedly broken and resealed.

The use of polymeric valve liners allows further opportunity for valve sealing, for instance by heating to fuse the polymeric liner. See for instance, U.S. Pat. Nos. 3,831,643, 4,003,188, and 4,066,108 which disclose the use of a pair of heated jaws for engaging a valve sleeve internally coated with a heat sensitive adhesive material. The crimped and heat sealed valve sleeve is then stuffed into a pocket on the side of the valve. See also U.S. Pat. No. 4,367,620 where a polymeric valve liner which is held in a collapse state by the application of vacuum through porous windows in the polymeric liner. Such methods are not without their disadvantages, for instance, slow heating and the possibility of thermal degradation of the bag.

Other methods of sealing have been applied to open top bags where opposing side walls are brought together and often sewn in the planar margin formed by the juxtaposed walls. Where such bags are laminates having a thermoplastic-coated, metal foil inner layer a fusion seal is possible. See U.S. Pat. No. 3,146,564 which discloses apparatus for pressing together the sewn top margins to allow commingling of the thermoplastic coating during induction heating. The opposing top margins are then passed through a series of opposing compression rolls to maintain contact of the inner surfaces and thus promote fusion of the opposing bag walls. Such methods and apparatus, which are used to join layers extending from the exterior of a bag, cannot be practiced on valves having layers lying within a wall of a bag. Accordingly, prior to this invention, there was no known way to practically apply induction heat sealing methods to filling valves which do not extend from a bag but rather lie within a bag wall.

It is an object of this invention to provide methods and apparatus for rapidly sealing by induction heating valves lying substantially within a wall of a bag.

Another object of this invention is to provide collapsible tubular laminates useful as sealable valves for protecting the integrity of materials stored in bags, such as multi-walled bags.

Still another object of this invention is to provide a bag with a valve that can be sealed rapidly without significantly adversely affecting the bag material, for instance by the application of excess heat.

A further object of this invention is to provide a seal in a bag valve that cannot be readily unfastened without destroying the valve or the bag, thereby providing a greater degree of assurance that there has been no loss of material from the bag or introduction of foreign material into the bag.

These and other objects of the invention will be more readily apparent from the following detailed description.

SUMMARY OF THE INVENTION

This invention provides collapsible tubular laminates useful as bag valves. Such laminates comprise an inner layer of a thermoplastic polymer and a metal foil layer. In preferred embodiments, the metal foil layer extends over a semicylindrical surface of the inner layer. In may cases, it is advantageous for the metal foil layer to be covered by an adhering outer paper layer.

This invention also provides bags having such collapsible tubular laminates as filling valves. In a preferred embodiment, such laminates are located substantially entirely within the bag wherein the valve opens through a hole in a wall of the bag.

Another aspect of this invention provides a bag having a tubular, sealable filling valve which is integral with and extends through a wall, such as an end closure section, of the bag between an inner wall layer and outer wall layer of the bag where the valve has a thermoplastic polymeric inner layer and means for inductively heating at least a portion of the thermoplastic inner layer. Such valves are adapted to be formed into a tubular shape to facilitate filling, that is to allow particulate material to communicate through the bag. Such bags are also readily collapsible, for instance, to form two, substantially contacting, opposing sections to facilitate sealing by induction heating from an electromagnetic field so that such opposing sections of the thermoplastic polymeric layer can fuse upon cooling.

This invention also provides methods and apparatus for sealing a bag having such valves, for instance, by passing a collapsed valve in proximity of an electromagnetic field induction heating source to heat the polymeric layer, whereby opposing sections of the valve are fused upon cooling.

DETAILED DESCRIPTION OF THE INVENTION

Figure 1:
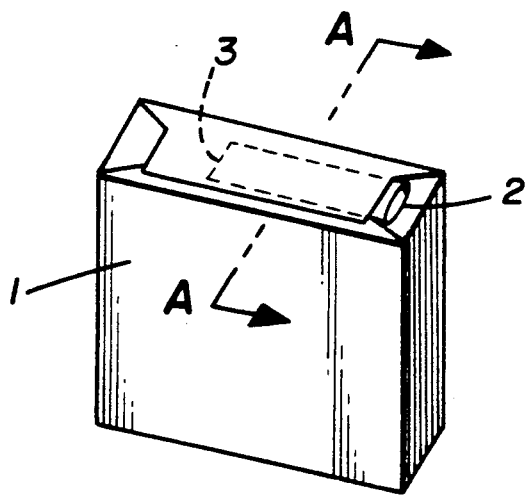
FIG. 1 is a perspective illustration of a bag according to this invention having a valve in an end closure segment thereof.

FIG. 1 illustrates bag 1 according to this invention where valve 2 is located, as indicated by dotted line 3, substantially in the plane of one wall of the bag, advantageously between walls of an end closure of the bag. The valve can be of a length such that it does not extend substantially outside of the walls of said end closure; or the valve may extend with a sleeve substantially beyond the end clososure. In many cases it is desirable that the bag be of multi-wall construction. Even in other cases where the bag is of single wall construction, e.g. like the common paper grocery sack, the valve is still conveniently located between overlapping layers forming the end closure. Such bags can be fabricated from a variety of materials such as paper or polymeric material. In many instances it is desirable that the walls of the bag be air permeable to facilitate filling of the bag.

Figure 2:
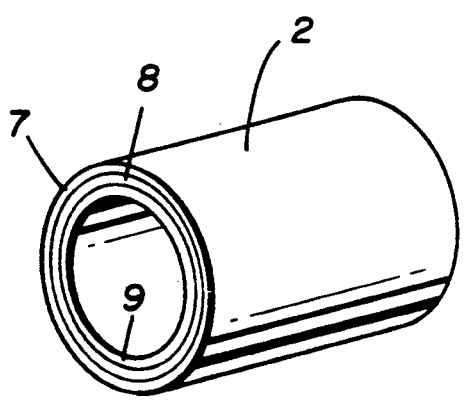
FIG. 2 is a schematic illustration of a valve useful in a bag of this invention.
Figure 6:
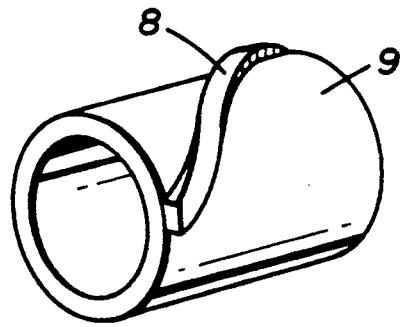
Figure 3:
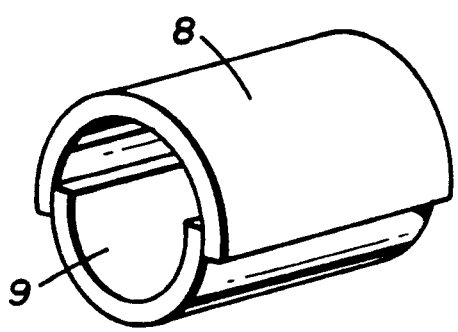
Figure 7:
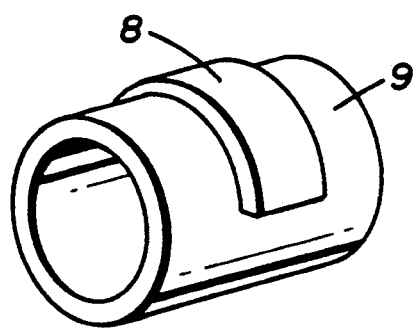

FIG. 2 illustrates one embodiment of a collapsible valve useful in the bag of this invention. The valve is illustrated in an open tubular form as used in bag filling operations. Valve 2 is a tubular laminate with outer layer 7 comprising Kraft paper; intermediate layer 8 comprising a metal foil provides means to inductively heat inner layer 9 comprising a thermoplastic polymer. A great many variations of the valve illustrated in FIG. 2 are useful in embodiments of bags according to this invention. For instance outer layer 7 can comprise a single or multiple layers of a variety of materials, such as paper or polymeric films. Outer layer 7 can circumscribe the entire periphery of the valve, part of periphery or, optionally, be omitted.

To provide the means to inductively heat the thermoplastic polymeric inner layer, intermediate layer 8 can comprise a great variety of metal foils of varying thickness. Aluminum foil is generally preferred because of its low cost and ductility. Such means for inductively heating is adjacent to at least a part of inner layer 9 which can comprise a variety of thermoplastic polymeric materials such as polyolefins which are often preferred because of their availability and low cost. A convenient polyolefin material is polyethylene.

In some embodiments, e.g. when the valve extends with a sleeve beyond the end closure, inner layer 9 may be of a shorter length than the entire valve, and be located, for instance, substantially in said sleeve. In many other embodiments, inner layer 9 will extend over the entire length of the valve.

Alternative embodiments of the intermediate and inner layers of the valve are illustrated perspectively in FIGS. 3, 4, 5, 6 and 7 which show that the internal peripheral segment of the valve can comprise thermoplastic polymeric layer 9, metal foil 8, or a combination thereof. In the embodiment shown in FIG. 3, the internal peripheral segment of the valve comprises adjacent layers of thermoplastic polymer 9 and metal foil 8. In many cases it may be preferred that the inner surface of said foil have laminated thereto a film of thermoplastic polymeric material. In the embodiment shown in FIGS. 4, 5, 6 and 7, the thermoplastic polymeric inner layer 9 extends over a substantially major portion, e.g. the entirety, of the internal periphery of the valve, and the metal foil 8 is in various locations around the external periphery of layer 9, extending in some cases at least a major portion of the length of said valve.

Figure 4:
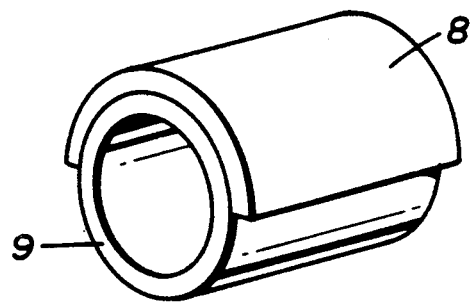
FIGS. 3, 4, 5, 6 and 7 are perspective illustrations of the internal peripheral segments of a valve, comprising thermoplastic polymeric material and metal foil, useful in embodiments of this invention.
Figure 5:
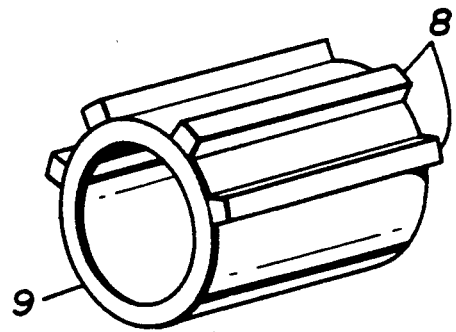

With reference to FIG. 4, in a preferred embodiment the valve comprises an inner layer 9 of polyethylene, e.g. having a basis weight of 75 g/m². Layer 8 extending over about a semicylindrical surface of inner layer 9 is an aluminum foil/Kraft paper laminate comprising aluminum foil, e.g. having a thickness of about 0.013 mm coated on both sides with a thin layer of adhesive, e.g. polyethylene. The external layer of the laminate comprises Kraft paper, e.g. having a basis weight of 250 g/m², to facilitate gluing the aluminum foil laminate portion of the valve to the end segment of the bag. The metal foil and paper are advantageously laminated to less than one half of the periphery of the inner layer to allow the tubular laminate to readily collapse into a flat sheet.

In many embodiments it is also desirable that a portion, e.g. a substantial portion of the length of the valve extending within the bag be provided with one or more slits, for instance to facilitate filling as well as valve collapse.

Figure 8:
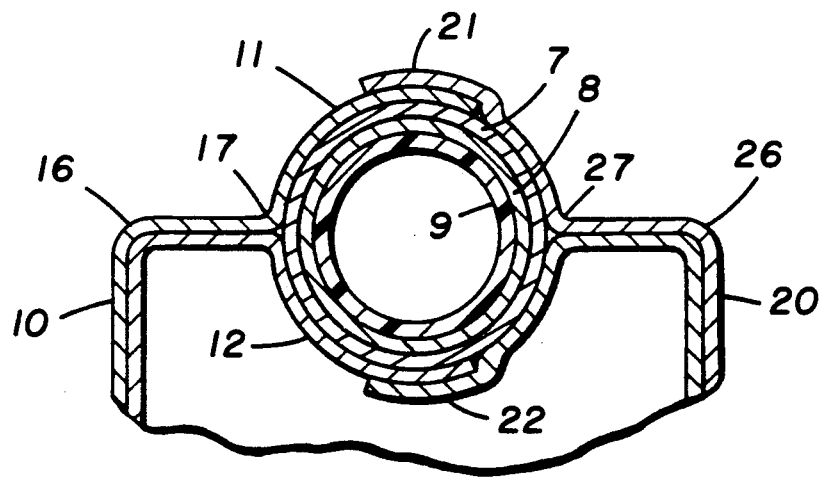
FIGS. 8, 9 and 10 are schematic illustrations of a cross-sectional view of an end segment of a bag having a valve according to this invention with FIG. 8 illustrating the valve in a tubular form and FIG. 9 illustrating the valve in a collapsed form.

With reference to FIG. 8, there is illustrated a cross-sectional view (along cutting plane A—A of FIG. 1) of an end closure wall of a bag having an expanded valve extending through the wall of the bag between inner and outer wall layers. In the cross-sectional representation of FIG. 8 a multi-layered bag wall 10 bends at point 16 to form part of an end closure wall, separating at point 17 into outer wall layer 11 and inner wall layer 12 which extend around a valve comprising a tubular lamination of outer paper layer 7, metal foil layer 8 and inner thermoplastic polymeric layer 9. The end closure is completed by the extension of multi-layered wall 20 which bends at point 26 to form the other part of end closure wall, separating at point 27 into outer wall layer 21 and inner wall layer 22. The interface of the various layers 7, 11, 12, 21 and 22 are conveniently adhesively bonded to secure the valve substantially in the plane of the end closure wall of the bag. In this regard the valve is divided into semicylindrical sections between separating points 17 and 27. The exterior layers of the valve in each of the two semicylindrical sections are adhesive bonded to the respectively contiguous outer and inner wall layers of the bag.

Desirably such valves are adapted to be collapsed such that the semicylindrical sections form two, corresponding substantially contacting, opposing sections; in such cases the foil will preferably traverse at least a portion, more preferably a major portion, of one of the opposing sections.

Figure 9:
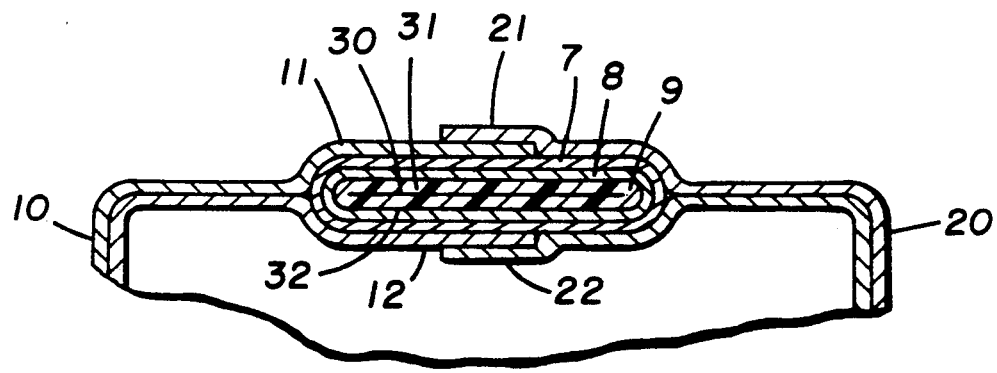

FIG. 9 is a cross-sectional illustration similar to that of FIG. 8 except that the tubular valve is collapsed such that the thermoplastic polymeric layer 9 is formed into an outer opposing section 31 and an inner opposing section 32 which contact at interface 30. With the application of an electromagnetic field the metal foil of layer 8 will rise in temperature. The intensity and duration of the electromagnetic field is desirably at a level such that the temperature of the metal will rise above the melting temperature of a thermoplastic polymeric material causing a fusion at interface 30 upon cooling of the thermoplastic material.

Figure 10:
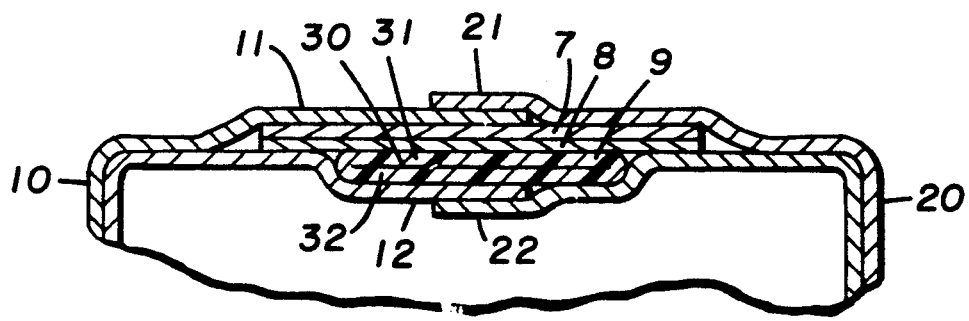

FIG. 10 illustrates in cross-sectional view (along the cutting plan A—A of FIG. 1) an end closure wall of a bag having a collapsed valve according to a preferred embodiment of this invention. The valve has a tubular layer 9 of thermoplastic material, e.g. a polyolefin, such as polyethylene, which is shown to be collapsed into two opposing, flat sections 31 and 32 which contact each other at interface 30. Adhered to section 31 there is a laminate of a metallic foil layer 8, e.g. aluminum foil, and an outer paper layer 7 which facilitates adhesion of the valve to the outer wall layers 11 and 21. Inner wall layers 12 and 22 are conveniently adhered to section 32 of the thermoplastic layer.

This invention further provides a method of sealing a bag having a filling valve such as described herein. In this method a valve having a thermoplastic polymeric inner layer and metal foil adjacent to at least a part of said layer is collapsed to form two, substantially flat, opposing sections. Such collapsed valve is then passed in proximity of an electromagnetic field induction heating source of sufficient power such that said foil is heated by induction, e.g. to about the melting temperature of said polymeric inner layer. The heated foil can heat the polymeric inner layer, whereby contacting, opposing sections of the valve are fused upon cooling of the thermoplastic polymeric material.

In practice such bags can be filled by inserting a filling nozzle into the valve which has been expanded into tubular form for instance, in an end closure of a bag. When the bag is sufficiently filled, the nozzle is removed from the valve. Due to stress on the end closure, provided in part by the particulate fill in the bag, the valve will generally tend to collapse to form two, substantially flat, opposing sections. In some cases it may be desirable depending on the efficiency of operation of the filling machine to remove particulate material from within the valve to preclude separation of the polymeric surfaces with granules which may be adverse to adequate sealing. Such particulate removal can be effected for instance by applying a vacuum nozzle within the valve or by rotating the bag to cause particulate to fall into the bag.

In many cases it may be advantageous to force the bag wall containing the valve against the particulate fill to assist in maintaining the valve in a collapsed form that will afford fusion of the opposing sections of the thermoplastic layers. A particularly advantageous method of ensuring that the opposing sections of the thermoplastic layers of a collapsed valve are in intimate contact during the heating and cooling of the sealing step is to position the bag such that the end closure section having the valve is the lowermost part of the bag. In this way the weight of the particulate material will assist in maintaining the valve in a collapsed form by providing force from inside the bag against the wall containing the valve.

Figure 11:
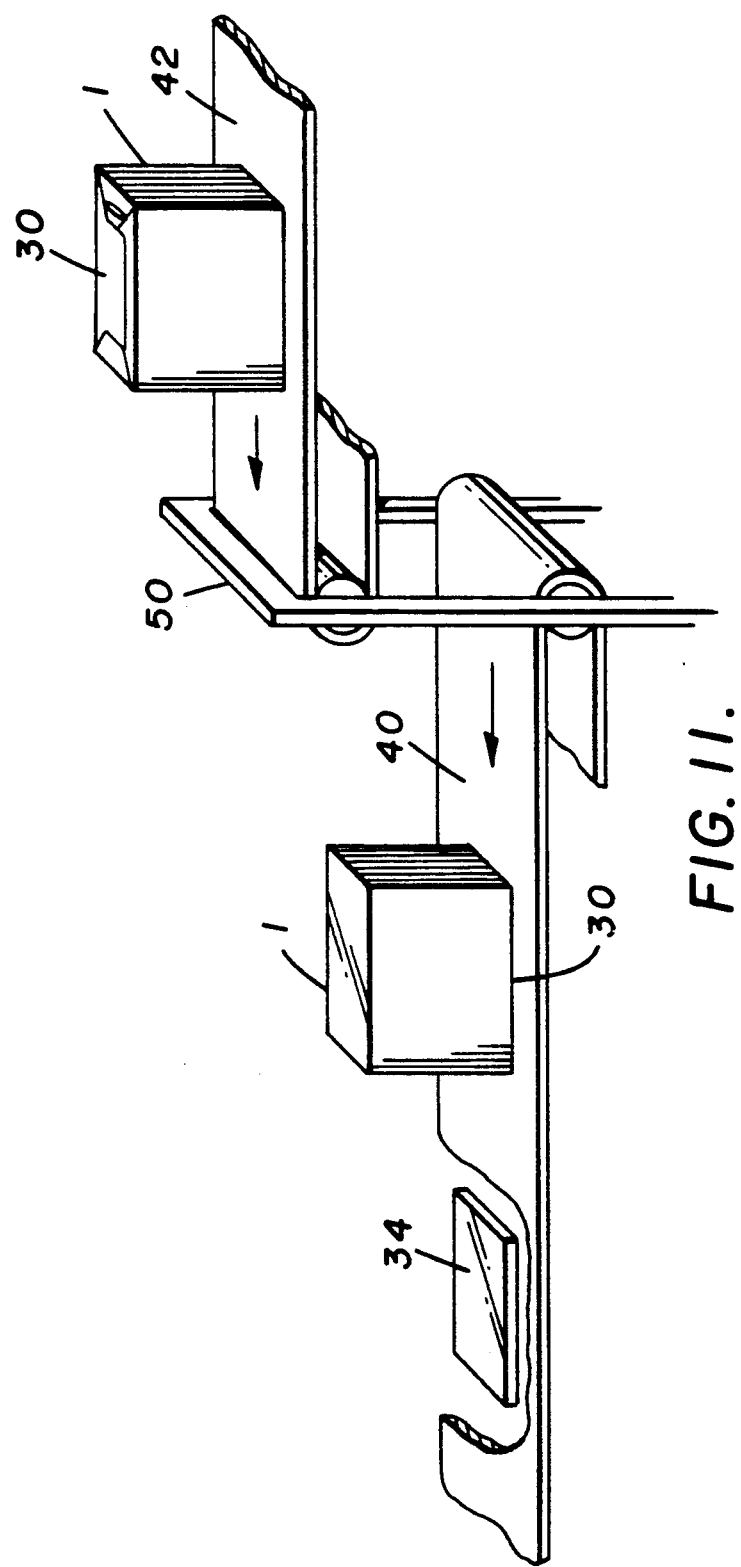
FIG. 11 is a schematic illustration of apparatus useful in the method of sealing bag valves according to this invention.

With reference to FIG. 11, which illustrates one embodiment of apparatus according to this invention, bag 1 is shown having a valve as described herein in end closure 30, the uppermost panel as a bag would be discharged from a filling operation. The bag is shown being carried on conveyor 42 in a standing position which can be maintained by the assistance of guide rails (not shown). Conveyor 42 will transport the bag to trip rail 50 which causes the bag to rotate between guide rails (not shown) as it falls to lower conveyor 40 such that end closure 30 is the lowermost panel of the bag. Conveyor 40 comprises a non-metallic belt that permits transmission of electromagnetic radiation from an electromagnetic field generator 34, positioned under the moving belt. When the valve passes in proximity of the electromagmetic field generator, heat is induced in the metal foil. The strength of the electromagnetic field and/or the speed of the belt can be readily adjusted to provide adequate heating of the metal foil such that its temperature will rise above the melting temperature of the thermoplastic polymeric material being maintained in a collapsed form such that sealing of the valve will occur.

While the invention has been described herein with regard to certain specific embodiments, it is not so limited. It is to be understood that variations and modification thereof may be made by those skilled in the art without departing from the spirit and scope of the invention.

I claim:

1. A thermoplastic tube comprising first and second collapsible semi-cylindrical sections, wherein said first section consists essentially of a thermoplastic layer and said second section consists essentially of a laminate of a thermoplastic inner layer, an intermediate metal foil layer and an outer paper layer.

* * * * *